Aug. 31, 1926.
H. MOSCHEL ET AL
1,597,995
SWEEP RAKE
Filed May 3, 1922 4 Sheets-Sheet 4
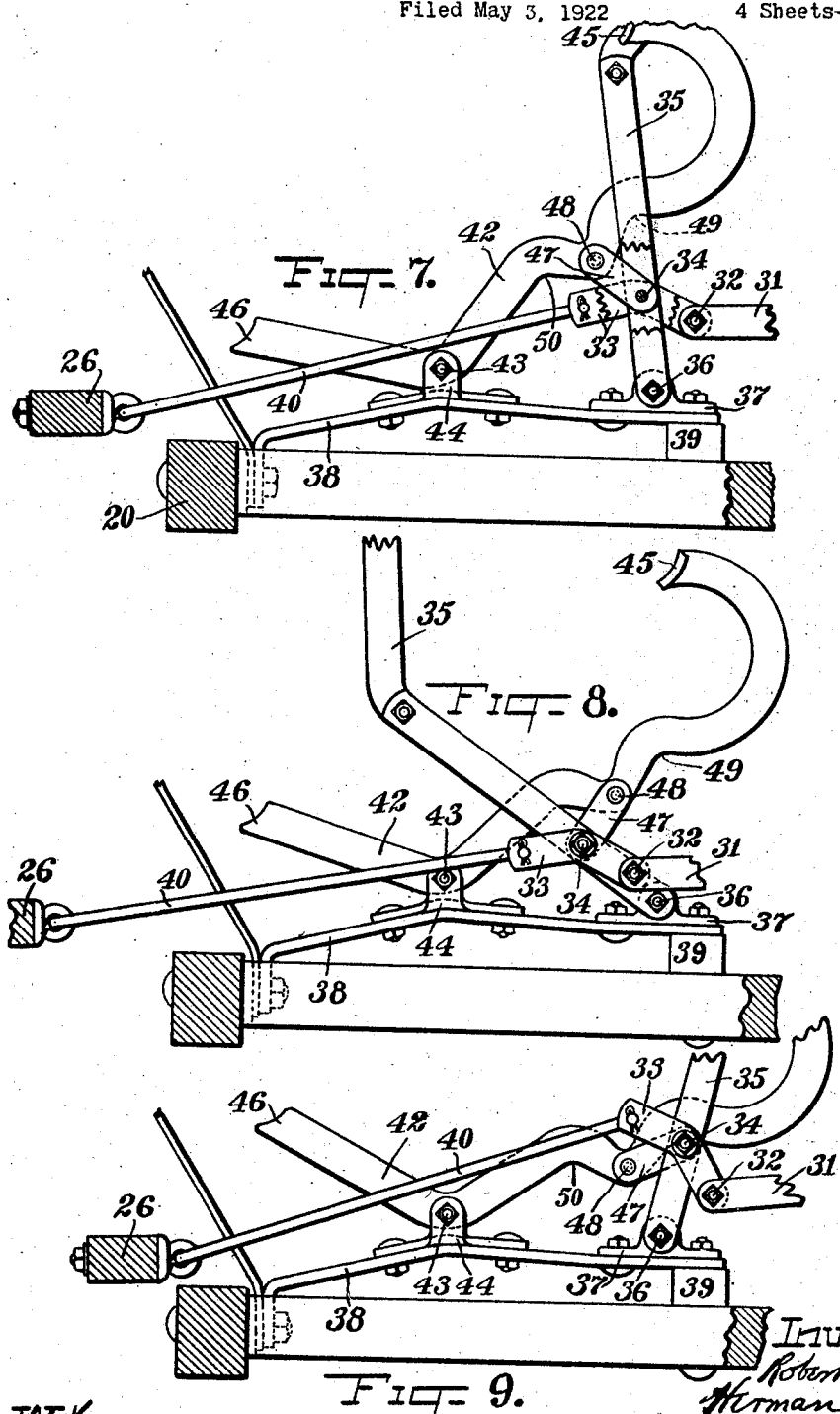

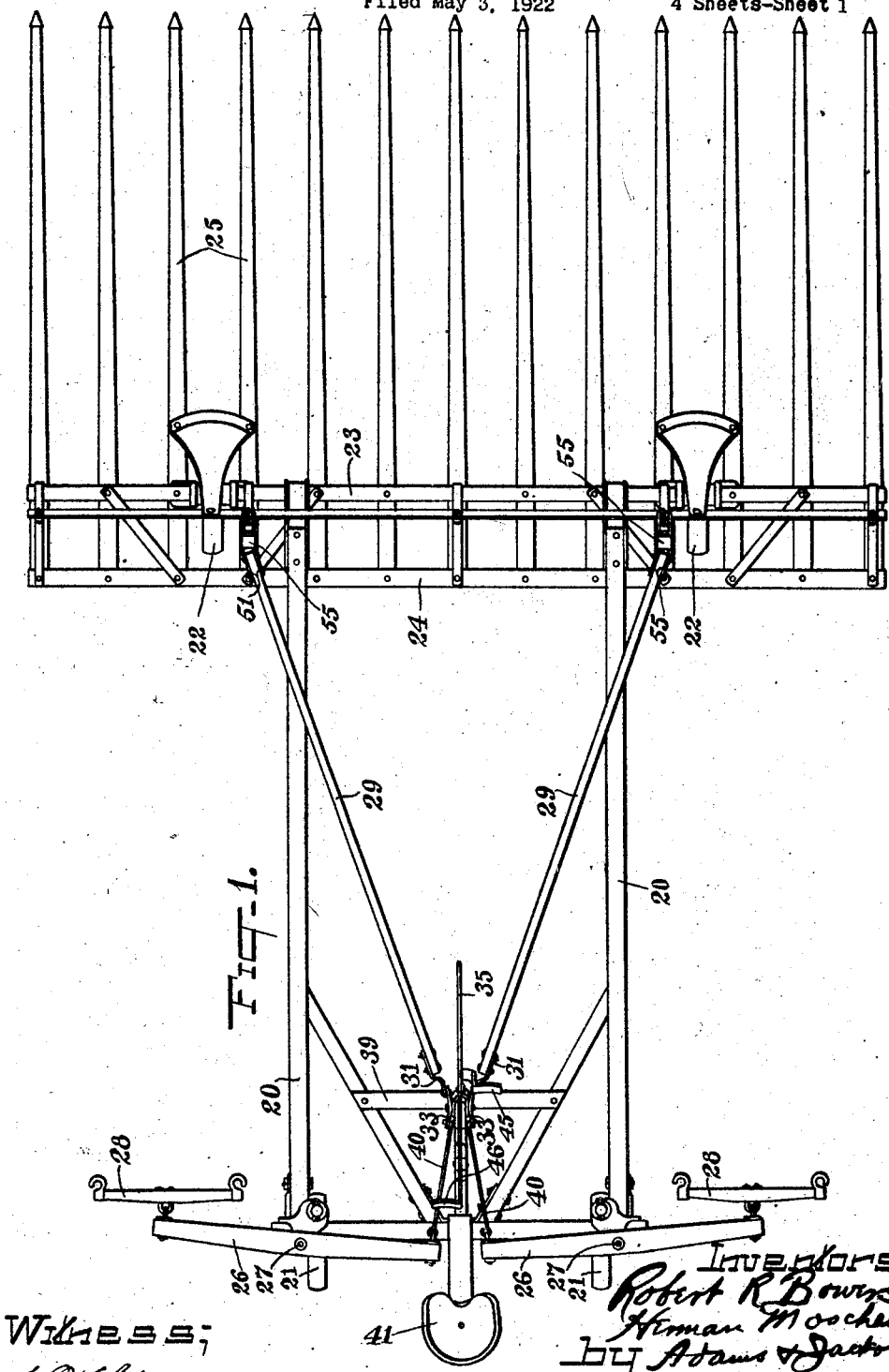

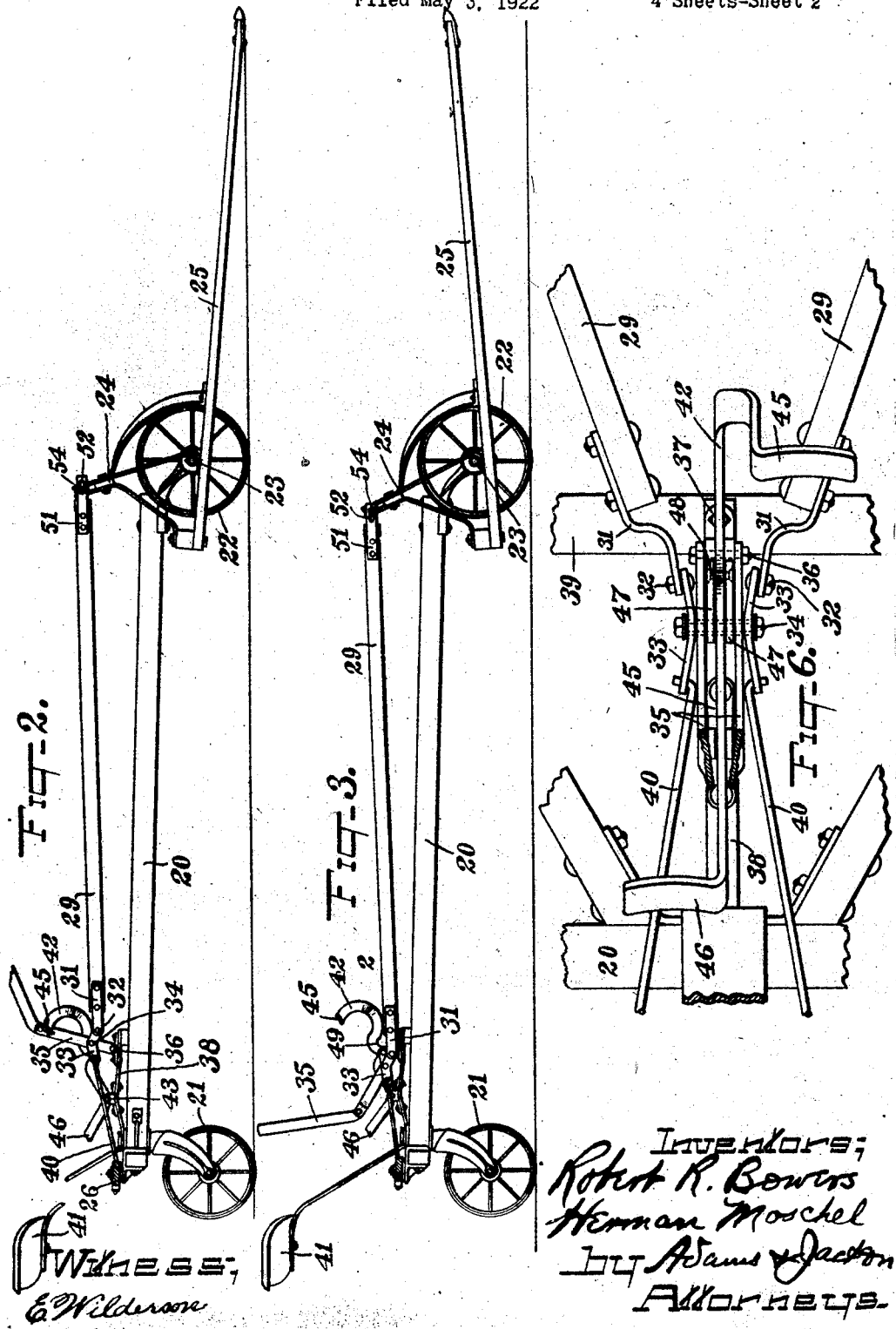

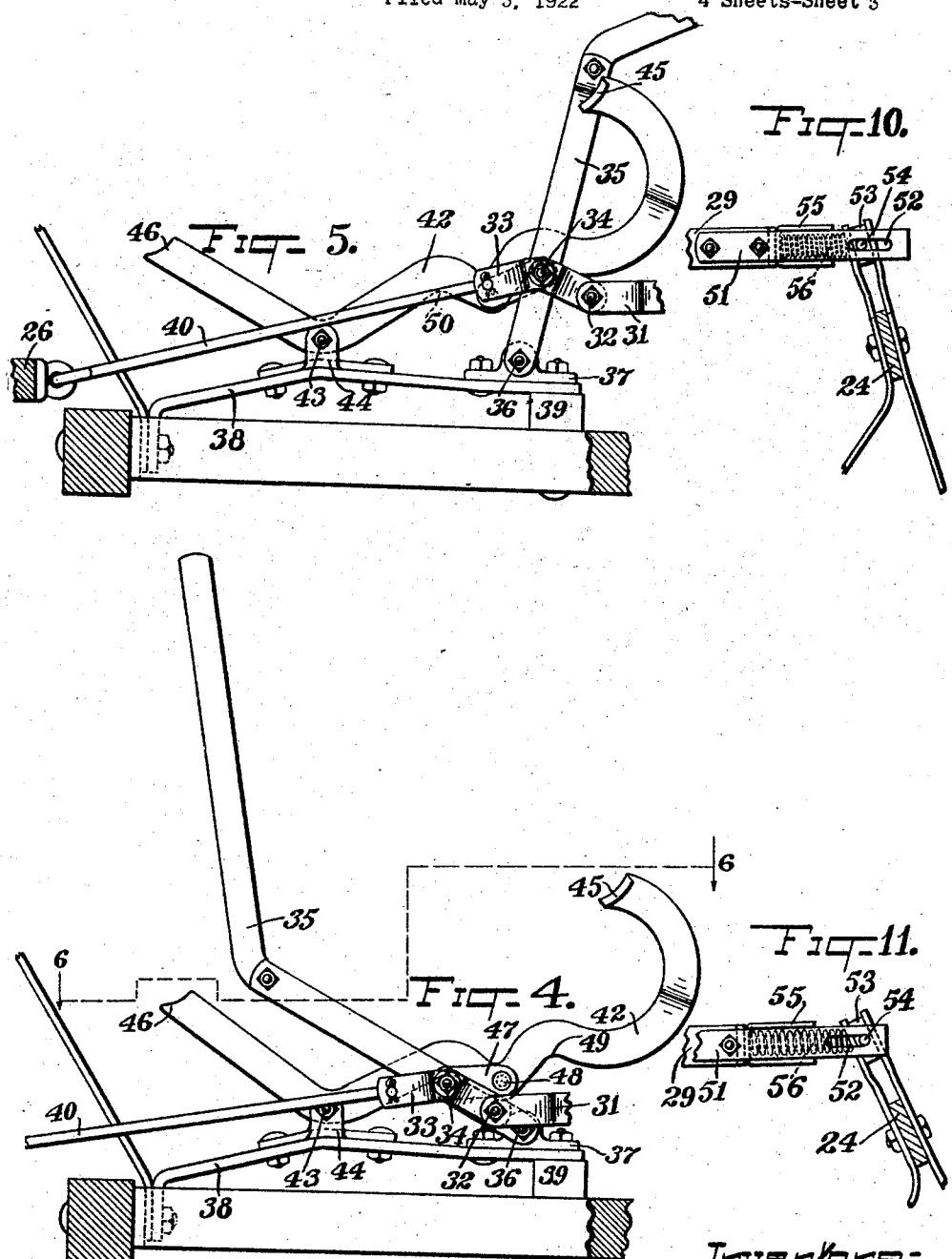

Patented Aug. 31, 1926.

1,597,995

UNITED STATES PATENT OFFICE.

HERMAN MOSCHEL AND ROBERT R. BOWERS, OF OTTUMWA, IOWA, ASSIGNORS TO DAIN MANUFACTURING COMPANY OF IOWA, OF OTTUMWA, IOWA, A CORPORATION OF IOWA.

SWEEP RAKE.

Application filed May 3, 1922. Serial No. 558,213.

This invention relates to that type of sweep rakes in which the head that carries the raking teeth is pivotally mounted on a wheel-supported frame so that by rocking such head the raking teeth may be raised from the ground to facilitate transporting a load of hay that has been gathered by the teeth and to also so hold such teeth clear of the ground when the machine is moving to or from a field.

It is common practice in connection with rakes of this character to provide either a hand lever or a foot lever, or a combination of both, with suitable connections to the rake-head, for rocking such head to carry the teeth into non-raking position, and it is also common to so connect such lever devices with pivoted double-trees that the draft of the team is utilized to furnish power required to aid in lifting the rake teeth from the ground. In one class of such rakes the lever mechanism is held locked in position during the raking operation, and in another class the required raking position of the teeth is maintained by pressure applied by the driver of the machine to the lever mechanism. The first class referred to is objectionable by reason of the fact that the said locking is of such an unyielding or fixed character as, at times, result in a breaking strain being imposed upon those members—commonly called the pull poles—that connect the lever mechanism with the rake-head, such breaking strain being caused, especially when the rake teeth are heavily loaded, by reason of the front wheels of the machine dropping into a depression or the teeth striking an obstruction. The chief objection to the other class above referred to is that it places a heavy burden on the operator, as it requires his constant attention to the lever mechanism and the exercise of much of his strength to manipulate such mechanism against the force of the draft applied through the double-trees.

It is one of the objects of our invention to provide a construction and arrangement of mechanism interposed between and connected with the draft devices and the rake-head that, while permitting the draft of the team to be utilized for aiding in raising the rake teeth from the ground, will hold the rake-head in either a raised or lowered position, and when in the latter position will permit a certain yielding or movement of the parts to obviate the danger of breakage such as referred to in connection with the first class of machines mentioned. It is also an object of the invention to so construct and arrange such interposed mechanism that the rake-head may be locked against turning after it has been rocked to raise the raking teeth into load-carrying or transporting position. Still another object is the provision of improved means in connection with a lifting and locking mechanism for manually breaking the locking of the rake-head in either of its said positions, and also for permitting the driver to assist in the operation of turning the rake-head to bring the teeth into the raised or carrying position. These several objects we accomplish by the means shown in the drawings and hereinafter particularly described. That which we believe to be new will be set forth in the claims.

In the drawings,—

Fig. 1 is a top or plan view of a sweep rake embodying our improvements;

Fig. 2 is a side elevation of the rake with the teeth thereof in lowered or raking position;

Fig. 3 is a view similar to Fig. 2 but with the teeth in raised position as when transporting a load of hay on such teeth or when the machine is being moved to or from a field;

Fig. 4 is an enlarged detail showing in side elevation the power-operated lifting devices and the lever mechanism in the positions they assume when the rake teeth are in elevated position as in Fig. 3;

Fig. 5 is a view similar to Fig. 4 but with the parts in the positions they assume when the rake teeth are in lowered position as shown in Fig. 2.

Fig. 6 is a top or plan view of the parts shown in Fig. 4, the view being taken from the line 6—6, one of the members being in section as indicated by such line;

Fig. 7 is an enlarged detail showing in side elevation the positions assumed by the members of the lever mechanism when their locking engagement has been broken preparatory to raising the teeth of the rake from the lowered position shown in Fig. 2 to their elevated position shown in Fig. 3, some portions of the mechanism being broken away;

Fig. 8 is a view very similar to Fig. 7 but showing the parts when their locking engagement has been broken preparatory to permitting the teeth of the rake to pass from raised to lowered position;

Fig. 9 is a view of the same parts that are shown in Figs. 7 and 8 and showing the position into which the power lifting devices are moved to relieve the strain upon them when the teeth of the rake strike on obstruction;

Fig. 10 is a detail showing the manner of connecting the pull poles with the rake-head, the parts being in the position they assume when the teeth of the machine are in the lowered or raking position of Fig. 2; and Fig. 11 is a view similar to Fig. 10 but with the parts in the position that they assume when the rake teeth are raised as in Fig. 3.

Referring to the several figures of the drawings,—20 indicates the usual frame of a rake of this character, comprising, as shown in Fig. 1, two parallel side bars connected together at their rear ends by a cross bar. The frame at its rear end is supported, as usual, by two caster wheels 21, and at its front end by wheels 22 that are mounted on a long axle 23. The rake-head is of ordinary construction, and is indicated generally by 24, such rake-head being so journaled upon the axle 23 as to be capable of being rocked thereon to permit the usual forwardly-extending teeth carried by the rake-head to be lowered into the operative raking position, as shown in Fig. 2, or turned up into load-carrying position as indicated in Fig. 3, the said rake teeth being indicated by 25. At the rear of the rake frame are the usual draft attachments which, as here shown, comprise two double-trees 26, each of which is pivoted intermediate its length at 27 to a corner portion of the frame 20, and connected in the usual manner to the outer end of each double-tree is a single tree 28, to which latter members the draft team is to be attached. Connected with the rake-head in a manner hereinafter described, and extending rearwardly therefrom in a convergent manner are two pull poles each indicated by 29, such pull poles forming part of the power-lifting mechanism of the machine. Each pull pole at its rear end is adapted for connection with another member of such power-lifting mechanism, the connecting means shown for each pole being a bent metal strap 31 that is bolted or otherwise secured to its pole. The rear or free end of each such strap is pivotally attached at 32 to one end of an intermediate member, which in the present instance is in the form of a link 33. The two intermediate members or links 33 that are respectively connected with the two pull poles lie parallel with each other and spaced a considerable distance apart, as best shown in Fig. 6, each link in the construction shown being downwardly bent centrally and, preferably, also having its end portions bent outward to some extent, as shown in said Fig. 6, the latter bending being merely to better permit the attachment thereto of the parts directly connected therewith, one of which, as stated, is a pull pole 29. The spaced-apart parallel links are, at substantially midway of their length, pivotally mounted upon a bolt 34 that passes through a longitudinally movable member, which in the illustrated construction is in the form of a rocking arm 35 that is pivotally mounted upon the frame of the machine. This arm 35, as shown in said Fig. 6, is bifurcated at its lower portion, the two legs thereof standing substantially parallel with each other and spaced at some distance apart, and it is through these two lower spaced-apart parts of the pivoted arm that the bolt 34 above referred to passes, a link 33 lying close to the outer surface of each of said parts of the arm. The arm is pivotally mounted upon the frame of the machine by means of a bolt 36 that passes through the lower end portion of these spaced-apart members, and also through a bracket 37 which, in the construction shown, is secured upon a plate 38 located centrally between the two side bars of the main frame 20, such plate as here shown resting at its forward end upon a cross beam 39, and being secured at its rear end by being bolted to the rear bar of the main frame. Connected in any desired manner with the rear end of each of the links 33 is a draft rod 40, said two draft rods extending rearwardly in a divergent manner, as clearly shown in Figs. 1 and 6, the rear end of each draft rod being secured in any usual manner to the inner end of one of the double-trees 26. While each draft rod might advantageously be secured to its double-tree 26 and to its link 33, as shown, we do not confine ourselves to the exact construction shown, as any suitable manner of connecting these parts may be adopted that will permit the required operation of them. The pivoted arm 35 is adapted and intended to serve also as a hand lever, whereby the operator may manually assist in the turning of the rake-head, as hereinafter explained, and to that end we provide it at its upper end with an extension, as clearly shown in Figs. 1 and 3, which preferably stands at such an angle to the arm as to bring it into convenient reach of the driver on the seat 41.

From what has been said above, it will be obvious that when draft is applied through the single trees 28 to the outer ends of the double-trees 26, it will be transmitted in the form of a pull upon the draft rods 40, which will cause a turning of the bent links 33 and thereby cause such a pulling upon the pull poles 29 as to tend to raise the rake teeth off of the ground. Such being the tendency of the lifting mechanism, it is evident that means must be provided for normally preventing the raising of the teeth in this manner or otherwise of course the gathering of the hay off of the ground could not be accomplished. The means which we employ for preventing the turning of the teeth out of operative or hay-gathering position when and as desired, and yet permit such raising when necessary, comprises a lever system which includes as one of its members the pivoted arm 35 to which the rocking bent links 33 are attached.

The lever system referred to, in addition to the member 35, comprises a bent foot lever 42 which, as here shown, is pivotally connected at 43 with a bracket 44 that is bolted to the heavy plate 38 that supports, as stated, the bracket that the pivoted arm 35 is connected with, the point of attachment of the foot lever 42 being in rear of the point of attachment of the said arm 35. This foot lever is provided at its forward end with a foot rest 45, and at its rear end with a similar foot rest 46, as clearly shown in Fig. 6, such foot rests being preferably formed, as is commonly the case, by turned end portions of the bar that forms the main body of the lever. 47 indicates two links, which by reason of the function that they perform we designate as locking links, each lying against the inner face of one of the spaced-apart lower members of the pivoted arm 35, and pivotally attached thereto by the same pivot bolt 34 that connects the other links 33 with that arm. The other end portions of the locking links 47 lie against opposite sides of the foot lever 42, and are pivotally connected therewith by a pin or other pivot 48. Both forwardly and rearwardly of the said pivot 48 the lower edge of the foot lever 42 is provided with notches indicated respectively by 49 and 50 which, in the construction shown, are made by imparting to the foot lever a rather sharp downward bend. These recesses or notches at opposite sides of the said pivot point 48 are to adapt them to lie over and be engaged by the pivot bolt 34, so as to effect such a locking of the parts as will hold the rake teeth in either lowered or raised position, according to which one of the notches is so engaged.

With the rake teeth in lowered position, as in Fig. 2, and with the pivoted arm 35 held locked against turning, the pull exerted by the draft of the team will, of course, have no effect with respect to lifting the rake-head, but immediately upon the said arm 35 being released from locked position the draft of the team will, by reason of the pull exerted thereon through the draft rods 40, bent links 33 and pull poles 29, tend to cause a turning of the rake head that will bring the teeth thereof to raised position. Such backward pull of the draft rods will also, of course, cause a rearward turning of said arm 35 on its pivot 36 due to its being connected to the links 33 through the pivot bolt 34. In the construction shown the holding of the arm 35 in its said locked position is accomplished by having the foot lever 42 depressed to bring the forward notch or recess 49 in its lower edge down over the pivot bolt 34. With the foot lever so resting upon such bolt the locking of the pivoted arm, and consequently of the parts connected therewith and that comprise the power-lifting mechanism, is effected because of the fact that the pivot 48 that connects the locking links 47 with the foot lever is below a line extending between the centers of the pivots 34 and 43, and consequently the harder the backward pull exerted through the draft rods 40, the more firmly will the notched edge of the foot lever be held against the pivot bolt 34. It will be seen that the construction is in effect that of a toggle-lever, one arm being formed by the foot lever and the other arm by the parallel locking links 47, the said arms being slightly out of alinement and held firmly against flexing in a direction that would carry them to a still greater disalinement. Now when it is desired to effect a turning of the rake-head on the axle through the draft of the team so as to raise the rake teeth from the ground, it will be evident that the pivoted arm must be permitted to rock backwardly on its pivot 36, and this is accomplished through the lever means here shown by causing such a raising of the foot lever 42 as will break the toggle-like locking that has been described. To do this the driver will bear down upon the rear foot rest 46 of such foot lever which will raise the forward portion of the lever and at the same time raise the pivot 48 above the line of centers of the two pivots 34 and 43. Thereafter the pressure exerted by the operator on the foot lever will be released. So turning the foot lever brings the various lever members into substantially the position shown in Fig. 7, and thereafter the effect of the draft will be to turn the arm 35 on its pivot 36—this turning being aided, if necessary, by the operator exerting a backward pull on the member that is shown as attached to and forms a continuation of such pivoted arm. During the described operation the locking links 47 will swing in an arc around the pivot bolt 34 and, as shown in Fig. 4, the pivot bolt 34 will be carried backward to such a position that the rear notch or recess 50 in the lower edge of the foot lever will drop over and engage such pivot bolt, the parts then being in the position shown in Fig. 4. In such position they will be just as effectively locked as before, and hence the rake teeth will be held elevated as shown in Fig. 3. Such locking is maintained in the same manner as described for the locking of the parts to hold the rake teeth in lowered position,— that is, because of the fact, as Fig. 4 makes plain, that the pivot 48 that connects the locking links 47 with the foot lever is held at one side of a straight line passing through the centers of the pivots 34 and 43. Owing to the extent of the swinging action of the locking links 47, they will extend forward from the pivot 34 when the parts are in the position shown in Fig. 4, and to the rear of such pivot when the parts are in the position shown in Fig. 5.

To enable the rake teeth to be again lowered into hay-gathering position, the locking together of the power-lifting mechanism and the lever members must be broken, and this is accomplished by the operator again rocking the foot lever by pressure applied to the rear foot rest 46, the effect of which will be to raise the forward end of the foot lever as before, and at the same time carry the pivot 48 above the line of centers of the pivots 34 and 43, and after that is accomplished the forcing forward by the operator of the lever or pivoted arm 35 will cause the parts to move into the position shown in Fig. 5 and the parts be again locked together, as before described. In Fig. 8 the position of the parts is shown after the locking position of Fig. 4 has been broken preparatory to the forcing forward of the member 35 by the operator, as just mentioned.

It has been common practice to so connect the rake-head as a whole that it would have a certain amount of yield to prevent breakage in the event of striking obstructions or in case the front wheels dropped into a depression, and while such a yielding connection is of value and has been retained by us, and will be briefly described hereinafter, yet in many instances such connecting means are not sufficient by themselves to entirely obviate breakage or excessive straining of parts. With our construction, as hereinabove described, it is possible to allow for the rake as a whole to be subjected to strains and stresses that could not be conpensated for or absorbed by former constructions, and that, too, without destroying the locking together of the parts, and, inasmuch as the holding of the rake teeth in working position is in no way dependent upon strength exerted by the operator, also without effect upon the operator. In our construction as herein shown and described, in case the rake teeth meet with an obstruction, or in case the forward wheels 22 drop into a depression of sufficient depth that a severe strain is imparted to the pull poles 29, the pair of links 33 that the rear ends of such poles are respectively connected with will swing around their pivot 34 into the position shown in Fig. 9. Such yielding or turning of these links thus saves the pull poles and connected parts from breakage, and does not destroy the locking arrangement. Immediately upon the teeth clearing the obstruction or the front wheels passing out of the depression, the force of the draft transmitted through the draft-rods 40 will again turn the links 33 to their normal position to maintain the rake teeth in raking position, as in Fig. 2.

From what has been said, it is obvious that by our construction not only is the draft of the team adapted to be utilized for aiding in lifting the rake teeth off the ground into transporting position, but it is also utilized in holding such teeth to the ground in spite of obstructions that would tend to raise it therefrom, and that when obstructions or depressions are encountered of a character that would tend to cause breakage or undue straining of parts if the operating mechanism were locked rigidly in place there will be such a prompt and efficient yielding by certain members of the mechanism as to obviate any liability of damage to the machine—in other words, the shocks and strains incident to the rake teeth riding over obstructions or the front wheels entering depressions will be quickly absorbed, and the parts instantly returned to normal working position. It will thus be seen that our construction provides for such an automatic relative movement between the push poles and the frame of the machine as to prevent breakage or undue straining of the parts when such obstructions or depressions are encountered. The relative movement referred to that occurs when the rake-teeth encounter an obstruction that is to be overcome will be understood when it is borne in mind that the double-trees normally function as levers of the first class so that the force of the draft transmitted through the draft rods acts to pull down on the rear ends of the links 33 and thus push forward on the pull poles 29, and thereby hold the rake-teeth in proper working position, but when the teeth meet an obstruction, then, theoretically at least, said double-trees for the time being act as levers of the second class with the result that in overcoming the obstruction the rake-frame will move forward faster than the points of the draft connection. Of course, if animals are used as the draft power they would probably yield, to some extent, to the added strain on the tugs, but nevertheless to overcome the obstruction there must be a relative movement as suggested between the push poles and rake frame.

It is to be understood that, except as some of the appended claims relate to certain details of construction, our invention may be embodied in mechanisms differently constructed and arranged in many respects from the particular embodiment herein illustrated and described, both with respect to the connecting parts that extend back from the rake-head to the draft-attaching means as well as to the lever that serves to so lock said parts that the rake-teeth will be held either in raking or non-raking position. Furthermore, while we deem it advisable for the best results, and particularly because of lessening the labor of the operator, to use some lever means that will lock the parts as described, yet it is evident that the said connecting means between the rake-head and the draft-attaching means may be very advantageously employed without a locking lever, although in such a case the rocking lever or arm 35 would require the constant attention of the operator, but the burden thus placed upon him would not be so severe as in the use of machines employing unyielding devices that connect the rake-head with the draft-attaching means.

We have referred to the fact that we still retain in connection with the mounting of the rake-head of our machine a common construction designed to afford relief from jars or shocks, such construction being shown somewhat in detail in Figs. 10 and 11, and we prefer to retain some such construction, as it is of course valuable in obviating the effects of minor shocks that the rake-head receives. The construction referred to, briefly described, comprises parallel straps 51 in which, near the outer ends, are slots 52, a pair of such straps being secured to the forward portion of each pull pole 29. Opposite each pull pole the rake-head is provided with a block 53 from opposite sides of which project studs 54 that enter the slots 52. Between the straps on each pull pole 29 is a socket 55, which abuts against the end of the pole and, in connection with the straps 51, constitutes a support and guideway for a coiled spring 56, one end of which bears against the end of the socket, and the other against the rake-head. These springs are always under slight compression, so that the pins 54 are normally held at the forward ends of the slots, but when an obstruction is met the springs will yield and act as a cushion up to the point where they are fully compressed to absorb the backward thrust of the rake-head. It is evident that while such shock-absorbing construction may be efficient to some degree, it is not comparable in effectiveness with that which we have provided, as hereinabove described.

What we claim as our invention and desire to secure by Letters Patent is,—

1. The combination of a rake-frame, a pivoted toothed rake-head at the forward end and draft-attaching means adjacent the rear end thereof, and means connecting said rake-head with the draft-attaching means, said means comprising three members pivotally connected together end to end and all said members normally extending longitudinally of said frame, the two outer members being connected respectively with said head and draft-attaching means and the intermediate member being pivotally connected with a support mounted on said frame.

2. The combination of a rake-frame, a pivoted toothed rake-head at the forward end and draft-attaching means adjacent the rear end thereof, means connecting said rake-head with the draft-attaching means and comprising two members having their outer ends connected, respectively, with said head and draft means, and an intermediate member pivotally supported by said frame and connected with the end portions of said two other members.

3. The combination of a rake-frame, a pivoted toothed rake-head at the forward end and draft-attaching means adjacent the rear end thereof, other means connecting said rake-head with the draft-attaching means and comprising two members having their outer ends connected, respectively, with said rake-head and draft-means and their inner end portions being yieldingly connected together, said connecting means being movable bodily longitudinally of said frame, and a lever pivotally supported by the frame for locking said connecting means in either of said bodily-adjusted positions but permitting a yielding thereof when said rake-head is in lowered position and the teeth thereof meet an obstruction.

4. The combination with a rake having a wheeled frame, a pivoted toothed rake-head at the forward end of the frame and draft means adjacent the rear end thereof, of mechanism interposed between said rake-head and draft means and comprising two oppositely-extending members and a link pivotally supported by the frame to opposite end portions of which link said members are respectively connected, and means for locking said link against bodily movement longitudinally of the machine when the rake teeth are in raking position but permitting a turning thereof when the free forward movement of the rake is obstructed.

5. The combination with a rake having a wheeled frame, a pivoted toothed rake-head at the forward end of the frame and draft means adjacent the rear end thereof, of mechanism interposed between said rake-head and draft means and comprising two oppositely extending members and a link pivotally supported by the frame to opposite end portions of which link said members are respectively connected, said mechanism being movable bodily longitudinally of the frame, and means for locking said mechanism in its said different bodily-adjusted positions, said link being adapted to be rocked on its pivot while said mechanism as a whole is in one of its locked positions.

6. The combination with a rake having a wheeled frame, a pivoted toothed rake-head at the forward end of the frame and draft means adjacent the rear end thereof, of mechanism interposed between said rake-head and draft means comprising a plurality of end members and an intermediate member pivotally connected together, said mechanism being adapted to be moved as a whole into different positions longitudinally of the frame, supporting means carried by the frame, a pivot connecting said intermediate member with said supporting means and means for locking said mechanism against bodily movement as a whole but permitting said intermediate member thereof to turn on the pivot connecting it with said supporting means.

7. The combination with a rake having a wheeled frame, a pivoted toothed rake-head at the forward end of the frame and draft means adjacent the rear end thereof, of mechanism interposed between said rake-head and draft means and comprising two oppositely-extending members, a link pivotally supported by the frame to opposite end portions of which link said members are respectively connected, a movable support for such link, and means for locking said support against movement.

8. The combination with a rake having a wheeled frame, a pivoted toothed rake-head at the forward end of the frame and draft means adjacent the rear end thereof, of mechanism interposed between said rake-head and draft means and comprising two oppositely-extending members, a link pivotally supported by the frame to opposite end portions of which link said members are respectively connected, a forwardly and rearwardly-movable support for such link, and means for locking said support against movement in either direction.

9. The combination with a rake having a wheeled frame, a pivoted toothed rake-head at the forward end of the frame and draft means adjacent the rear end thereof, of mechanism interposed between said rake-head and draft means and comprising two oppositely-extending members, a link to opposite end portions of which said members are respectively connected, an arm pivotally connected with the frame and to which said link is pivoted, which arm is adapted to be rocked forwardly and rearwardly, and means for locking said arm against rocking in either direction.

10. The combination of a rake-frame, a pivoted toothed rake-head at the forward end and draft-attaching means adjacent the rear end thereof, other means connecting said rake-head with the draft-attaching means and comprising two members having their outer end portions respectively connected with said rake-head and draft-attaching means and a link connecting their adjacent inner end portions together, a rocking support for said link, and a lever pivotally supported by the frame and adapted to lock said connecting means in different adjusted positions.

11. The combination of a rake-frame, a pivoted toothed rake-head at the forward end and draft-attaching means adjacent the rear end thereof, other means connecting said rake-head with the draft-attaching means and comprising two members having their outer end portions respectively connected with said rake-head and draft-attaching means and a link connecting their adjacent inner end portions together, a rocking support to which an intermediate portion of said link is pivotally connected, and a lever pivotally supported from said frame adapted to engage at different points in its length with the pivot that attaches said link to said support, whereby said connecting means may be locked in different adjusted positions.

12. The combination of a rake-frame, a pivoted toothed rake-head at the forward end and draft-attaching means adjacent the rear end thereof, other means connecting said rake-head with the draft-attaching means and comprising two members having their outer end portions respectively connected with said rake-head and draft-attaching means and a link connecting their adjacent inner end portions together, a support to which said link is pivotally connected, and a lever pivotally supported from said frame, said link being provided with means for engagement by said lever, and said lever being adapted to engage at different points in its length with such means for holding the link and the members connected therewith in different adjusted positions.

13. The combination with a rake having a wheeled frame, a pivoted toothed rake-head at the forward end of the frame and draft means adjacent the rear end thereof, of mechanism interposed between said rake-head and draft means and comprising a pair of rods extending forwardly from the draft means, a pair of poles extending rearwardly from the rake-head, a pair of links with opposite end portions of which said pairs of rods and poles are pivotally connected, a forwardly and rearwardly movable support between said links and to which such links are pivotally connnected, and means for locking said support against movement in either direction.

14. The combination with a rake having a wheeled frame, a pivoted toothed rake-head at the forward end of the frame and draft means adjacent the rear end thereof, of mechanism interposed between said rake-head and draft means and comprising a pair of rods extending forwardly from the draft means, a pair of poles extending rearwardly from the rake-head, a pair of links with opposite end portions of which said pairs of rods and poles are pivotally connected, an arm pivotally connected with said frame and having its lower portion bifurcated upon opposite sides of which arm said links are pivotally secured, and means within the bifurcation of said arm for locking the arm against movement.

15. The combination with a rake having a wheeled frame, a pivoted toothed rake-head at the forward end of the frame and draft means adjacent the rear end thereof, of power-operated lifting mechanism interposed between said rake-head and draft means comprising two oppositely-extending members, a pivoted link to opposite end portions of which said members are respectively connected and a support movable longitudinally of the frame, to which support said link is pivotally connected, and a locking device for said power-operated mechanism comprising a lever pivotally connected with the frame and a link pivotally connected with both the said lever and movable support.

16. The combination with a rake having a wheeled frame, a pivoted toothed rake-head at the forward end of the frame and draft means adjacent the rear end thereof, of power-operated lifting mechanism interposed between said rake-head and draft means comprising two oppositely-extending members, a pivoted link to opposite end portions of which said members are respectively connected and an arm pivotally connected with the frame and adapted to be rocked forwardly and rearwardly, to which arm said link is pivotally connected, and a locking device for said power-operated mechanism comprising a lever pivotally connected with the frame and a link pivotally connected with both the said lever and the said pivoted arm.

17. The combination with a rake having a wheeled frame, a pivoted toothed rake-head at the forward end of the frame and draft means adjacent the rear end thereof, of power-operated lifting mechanism interposed between said rake-head and draft means comprising two oppositely-extending members, a pivoted link to opposite end portions of which said members are respectively connected and an arm pivotally connected with the frame and adapted to be rocked forwardly and rearwardly, to which arm said link is pivotally connected, and a locking device for said power-operated mechanism comprising a lever extending over the pivot that connects said link with said arm and a second link pivotally connected with said lever and rotatable about the pivotal point of attachment of the first-named link and said arm to a passed-center locking position.

18. The combination with a rake having a wheeled frame, a pivoted toothed rake-head at the forward end of the frame and draft means adjacent the rear end thereof, of power-operated lifting mechanism interposed between said rake-head and draft means comprising two oppositely-extending members, a pivoted link to opposite end portions of which said members are respectively connected and an arm pivotally connected with the frame and adapted to be rocked forwardly and rearwardly, to which arm said link is pivotally connected, and a locking device for said power-operated mechanism comprising a lever pivotally connected with the frame and extending over the pivot that connects said link with said arm and a second link pivotally connected with said lever and rotatable about the pivotal point of attachment of the first-named link with said arm, the edge of said lever being notched or recessed at each side of the point of attachment of the second-named link thereto to permit such link and lever to assume passed-center locking positions.

19. The combination with a rake having a wheeled frame, a pivoted toothed rake-head at the forward end of the frame, and draft means adjacent the rear end thereof, of power-operated lifting mechanism comprising a plurality of members pivotally connected together and pivotally connected both with the draft means and the rake-head, lever means for locking said mechanism against movement as a whole longitudinally of the frame, said means comprising an arm pivotally connected with the frame to permit it a forward and back rocking motion, a manually-operable lever pivotally connected with said frame, and a link pivotally connected at one end with said lever and at the other end with said arm and also with an intermediate member of said lifting mechanism.

20. The combination with a rake having a wheeled frame and a pivoted toothed rake-head at the forward end of the frame, of means for locking said rake-head in either one of two positions, said means comprising an arm and a lever each pivotally connected with the frame to permit of their being rocked longitudinally of the frame, said arm and lever crossing each other, a link connecting said arm and lever and rotatable about the point of attachment of the link to the arm during the movement of the parts from one locking position to the other to bring the point of attachment of said link to the lever into passed-center locking position, and means extending between said rake-head and said arm and pivotally connected with both such parts.

21. The combination with a rake having a wheeled frame and a pivoted toothed rake-head at the forward end of the frame, of means for locking said rake-head in either one of two positions, said means comprising an arm and a lever each pivotally connected with the frame to permit of their being rocked longitudinally of the frame, said arm and lever crossing each other, a link connecting said arm and lever and movable about the point of attachment of the link to the arm during the movement of the parts from one locking position to the other to bring the point of attachment of said link to the lever into passed-center locking position, the lever overlying the pivot that connects the link to the arm and resting thereon in either of the locked positions of the parts, and means extending between the said rake-head and arm and pivotally connected with both such parts.

22. The combination with a rake having a wheeled frame and a pivoted toothed rake-head at the forward end of the frame, of means for locking said rake-head in either one of two positions, said means comprising an arm and a lever each pivotally connected with the frame to permit of their being rocked longitudinally of the frame, said arm and lever crossing each other, a link connecting said arm and lever and movable about the point of attachment of the link to the arm during the movement of the parts from one locking position to the other to bring the point of attachment of said link to the lever into passed-center locking position, the lever overlying the pivot that connects the link to the arm and being provided in its lower edge with a notch or recess at each side of the point of attachment of the link with the lever to receive the other pivot that connects the arm and link together, and means extending between the said rake-head and arm and pivotally connected with both such parts.

23. The combination with a rake having a wheeled frame and a pivoted toothed rake-head at the forward end of the frame, of means for locking said rake-head in either one of two positions, said means comprising an arm and a lever each pivotally connected with the frame to permit of their being rocked longitudinally of the frame, said arm and lever crossing each other, a link connecting said arm and lever and movable about the point of attachment of the link to the arm during the movement of the parts from one locking position to the other to bring the point of attachment of said link to the lever into passed-center locking position, and means comprising a plurality of members pivotally connected together, one of said members having pivotal connection with the rake-head and another of said members having pivotal connection with said arm.

24. The combination with a rake having a wheeled frame and a pivoted toothed rake-head at the forward end of the frame, of means for locking said rake-head in either one of two positions, said means comprising an arm and a lever each pivotally connected with the frame to permit of their being rocked longitudinally of the frame, said arm and lever crossing each other, a link connecting said arm and lever and movable about the point of attachment of the link to the arm during the movement of the parts from one locking position to the other to bring the point of attachment of said link to the lever into passed-center locking position, and means comprising a plurality of members pivotally connected together, one of said members having pivotal connection with the rake-head and another of said members being pivotally connected with said arm at the same point that said link is connected with the arm.

25. The combination with a rake having a wheeled frame and a pivoted toothed rake-head at the forward end thereof, of a member mounted on the frame and movable longitudinally thereof, a connection extending between said member and rake-head, and a pivoted lever having a portion extending alongside of and past said member for engaging at a plurality of points with said member to hold such member and the said connection in different adjusted positions.

26. The combination with a rake having a wheeled frame and a pivoted toothed rake-head at the forward end thereof, of a member mounted on a frame and movable longitudinally thereof, a connection extending between said member and rake-head, and a pivoted lever having a portion extending alongside of and past said member, said lever having a plurality of recesses in one edge for engaging a projection on said member to hold such member and the said connection in different adjusted positions.

27. The combination with a rake having a wheeled frame and a pivoted toothed rake-head at the forward end thereof, of a member mounted on the frame and movable longitudinally thereof, a bar extending rearwardly from the rake-head, a link pivotally connecting the rear portion of said bar with said member to permit backward movement of the rake-head when the rake-teeth meet an obstruction, means also connected with said link for yieldingly opposing such movement, and a lever for holding said connection in a plurality of longitudinally-adjusted positions.

HERMAN MOSCHEL.
ROBERT R. BOWERS.